United States Patent [19]
Zoleta

[11] 3,835,645
[45] Sept. 17, 1974

[54] METHOD AND SYSTEM FOR REDUCING POLLUTANTS FROM ENGINE EXHAUST

[76] Inventor: Jose C. Zoleta, 54 169th St., Elmhurst, N.Y. 11373

[22] Filed: Feb. 8, 1973

[21] Appl. No.: 330,754

[52] U.S. Cl............... 60/274, 60/275, 60/298, 60/307, 23/277 C
[51] Int. Cl............................................ F01n 3/10
[58] Field of Search............ 60/274, 298, 307, 320, 60/321, 303, 275; 23/277 C; 432/72; 123/119 E

[56] References Cited
UNITED STATES PATENTS

| 1,118,269 | 11/1914 | Creveling | 60/320 X |
| 3,157,172 | 11/1964 | Mittelstaedt | 60/275 X |
| 3,285,709 | 11/1966 | Ennarino et al. | 60/294 X |
| 3,287,900 | 11/1966 | Soltau | 60/307 X |
| 3,300,964 | 1/1967 | Knopp | 60/307 |
| 3,513,929 | 5/1970 | Kim | 60/280 X |
| 3,603,081 | 9/1971 | McCrocklin | 60/303 X |
| 3,606,753 | 9/1971 | La Force | 60/274 |
| 3,656,303 | 4/1972 | La Force | 60/298 X |
| 3,685,502 | 8/1972 | Oberdorfer | 60/274 X |

FOREIGN PATENTS OR APPLICATIONS

| 1,436,597 | 3/1966 | France | 60/317 |

Primary Examiner—Carlton R. Croyle
Assistant Examiner—Robert E. Garrett
Attorney, Agent, or Firm—Watson Leavenworth Kelton & Taggart

[57] ABSTRACT

A method for eliminating pollutants in the operation of an internal combustion engine is disclosed. The engine is operated so that only enriched hydrocarbon and carbon monoxide pollutants are produced during engine operation, there being no nitrogen oxide produced. The hydrocarbons and carbon monoxide are then reacted with ozone to convert them to water and carbon dioxide. A system for eliminating pollutants in the operation of a vehicle also is disclosed.

5 Claims, 3 Drawing Figures

METHOD AND SYSTEM FOR REDUCING POLLUTANTS FROM ENGINE EXHAUST

BACKGROUND OF THE INVENTION

The problem of reducing pollutants emission to the natural environment is one of major importance. This is particularly true in respect of the pollutants which are emitted from the operation of internal combustion engines, particularly gasoline and diesel engines used in automobiles and other automotive type equipment. Because of the great numbers of such vehicles in use, the level of pollutants introduced into the environment by their operation is considerable. The principal pollutants emitted from operation of an internal combustion engine are hydrocarbons, carbon monoxide and nitrogen oxide. The reduction of emission of these pollutants from the operation of internal combustion engines is possible but known methods and devices for effecting the same are either so complex in character or prohibitive in cost for incorporation in the average automotive type vehicle that they have not enjoyed widespread use. Further, such pollutants reduction systems as have been employed in automotive type vehicles have not been completely successful in eliminating all of the pollutants noted above and additionally are especially ineffective in eliminating the presence of nitrogen oxide in the final products emitted to the atmosphere, which pollutant is particularly noxious and generated at increasing levels with increased loading of the engine.

SUMMARY OF THE PRESENT INVENTION

The present invention relates to the elimination of pollutants as an incidence of the operation of internal combustion engines especially as used in motor vehicle type equipment. In accordance with the present invention the elimination of these pollutants, that is, carbon monoxide, hydrocarbons and nitrogen oxide, is effected by deliberately creating an additional pollutant and employing the same in conjunction with the elimination of the others. This additional pollutant, ozone, is employed to react with the hydrocarbons and carbon monoxide to convert them to water and carbon monoxide. Further, the system of the present invention is a diathermic low temperature exhaust gas treating system as distinguished from known systems which are adiabatic systems. In accordance with the present invention the fuel burned in the internal combustion engine is combusted at an air/fuel ratio which is sufficiently deficient in oxygen to preclude the formation of nitrogen oxide in the engine during combustion. Accordingly, only an enriched pollutant flow of hydrocarbons and carbon monoxide will exhaust from the engine (along with nitrogen from the air used to support combustion). Desirably, this is effected by setting the fuel/air ratio of the engine to be deficient in oxygen at maximum horsepower rating of the engine, since if no nitrogen oxide is produced at that level none will be produced at operating levels below maximum, as nitrogen oxide levels increase normally with increased engine load where conventional fuel/air mixtures set for optimum economical operation are employed. The enriched pollutants produced in the engine are then directed from the engine manifold through a suitable cooling device to cool the products of combustion down to a relatively low temperature, for example, about 750° F. The latter is particularly desirable to eliminate temperature parameters in the exhaust which could give rise to nitrogen oxide production at a subsequent system location. For removing heat from the exhaust at this point, any suitable device can be employed although it is preferred that the exhaust be directed through a thermoelectric device wherein the thermal energy contained in the exhaust is converted to electrical energy. One such device is a Seebeck generator. One manner of converting the thermal energy of the exhaust to electrical energy for useful purposes is to employ the Seebeck generator in the manner described in co-pending application Ser. No. 312,895 filed Dec. 7, 1972 wherein there is disclosed the use of a Seebeck generator in conjunction with air-conditioning an automobile. Following the passage of the exhaust through the Seebeck generator, the now lower temperature exhaust is passed to a reaction zone. Concurrent with the operation of the engine, there is created a flow of secondary or atmospheric air provided by a suitable pumping means which air flow is directed through an ozone generator provided in any of various known forms, such as a radiant energy generator, that is, an ozone producing lamp or a spark discharge unit, so that at least a portion, but more desirably, all of the oxygen in the secondary air is converted to ozone. The ozone containing high pressure secondary air flow is then directed concurrently with the exhaust flow through a reactor wherein the ozone following the law of mass action combines with the hydrocarbons and carbon monoxide to produce water and carbon dioxide respectively. The reaction of the ozone with the hydrocarbons and carbon monoxide is carried out at relatively low temperature thereby precluding the formation of any nitrogen oxide in the reaction zone due to the presence of nitrogen therein from the exhaust and secondary air flow. Following the reaction of the exhaust and ozone containing atmospheric air, the resultant mixture is passed through the vehicle muffler and discharged to the atmosphere in conventional manner.

The reaction of the ozone in the secondary air flow and the carbon monoxide and hydrocarbons in the exhaust preferably is carried out in a reactor which involves delivery of the two streams in a coaxial flow, with the secondary air stream positioned inside the exhaust stream, both streams undergoing a helical flow course in the reaction zone, one clockwise and the other counterclockwise, through a suitable vortexing component accompanied by a radial discharge from the vortexing components to increase the mixing together of the gas streams and the reaction velocity of the ozone with the hydrocarbons and carbon monoxide. The reaction zone provides a zone wherein the hydrocarbon, carbon monoxide and ozone molecules, following as mentioned above, the law of mass action have their collision frequency and efficiency greatly enhanced to thereby increase the reaction velocity. Since the reaction of the carbon monoxide and hydrocarbons with the ozone results in the liberation of substantial quantities of heat, suitable means are provided for cooling the reaction zone to maintain the temperature thereof below the temperature at which nitrogen from the secondary air and exhaust can combine with the oxygen to form nitrogen oxide.

In addition to eliminating the emission of hydrocarbons, carbon monoxide and nitrogen oxide pollutants during the operation of the internal combustion engine, the present invention provides that the increased fuel consumption occasioned by the setting of an air/fuel ratio which is deficient in oxygen can be compensated for by the employment of the Seebeck generator to cool the exhaust. The Seebeck generator thus can be used to provide power for air-conditioning purposes thus providing for recovery of useful work from the exhaust and compensating to a greater extent for the increased fuel consumption. Additionally, the use of the Seebeck generator eliminates the need for a compression unit in the vehicle air-conditioning system so that the engine mounted drive pulley normally used to drive the compressor can be employed to operate the air pump required for supplying high pressure secondary air to the pollutants eliminating system. The present invention also provides a system for reducing pollutants emission including a special reaction chamber for increasing the reaction velocity between the ozone and hydrocarbon and carbon monoxide pollutants to convert the pollutants to innocuous emissions forms.

The invention, accordingly, comprises the method and system possessing the features, property and relation of elements which will be exemplified in the method and system hereinafter described, and the scope of the invention will be indicated in the claims.

BRIEF DESCRIPTION OF THE DRAWINGS

Other objects of the invention will be in part obvious and will in part appear from the following detailed description taken in conjunction with the accompanying drawings, wherein like reference numerals indicate like parts throughout and in which.

DESCRIPTION OF THE PREFERRED EMBODIMENTS

The present invention relates to a method and system for removing pollutants from the exhaust of an internal combustion engine consequent with the burning of a hydrocarbon fuel in the engine. It is applicable to spark ignition engines as well as compression ignition engines and gas turbines. In accordance with the present invention the major pollutants, i.e., carbon monoxide, hydrocarbons and nitrogen oxide, are eliminated from the engine emission by a method involving the deliberate creation of a fourth pollutant, ozone, to react with the hydrocarbons and carbon monoxide issuing from the engine to convert them to water and carbon dioxide. Additionally, and in accordance with the invention, nitrogen oxide is eliminated as a pollutant from the engine by operating the engine in a manner involving combusting the fuel at an air/fuel ratio which is deficient in oxygen providing oxygen only for preferential combining with the hydrocarbons in the fuel, there being insufficient oxygen available for combining with nitrogen so that the generation of nitrogen oxide within the engine itself is precluded. Further, the treatment of the exhaust is carried out at low temperatures in a manner as prevents production of any nitrogen oxide by reaction of the nitrogen in the secondary air or exhaust with the ozone.

Figure 1:
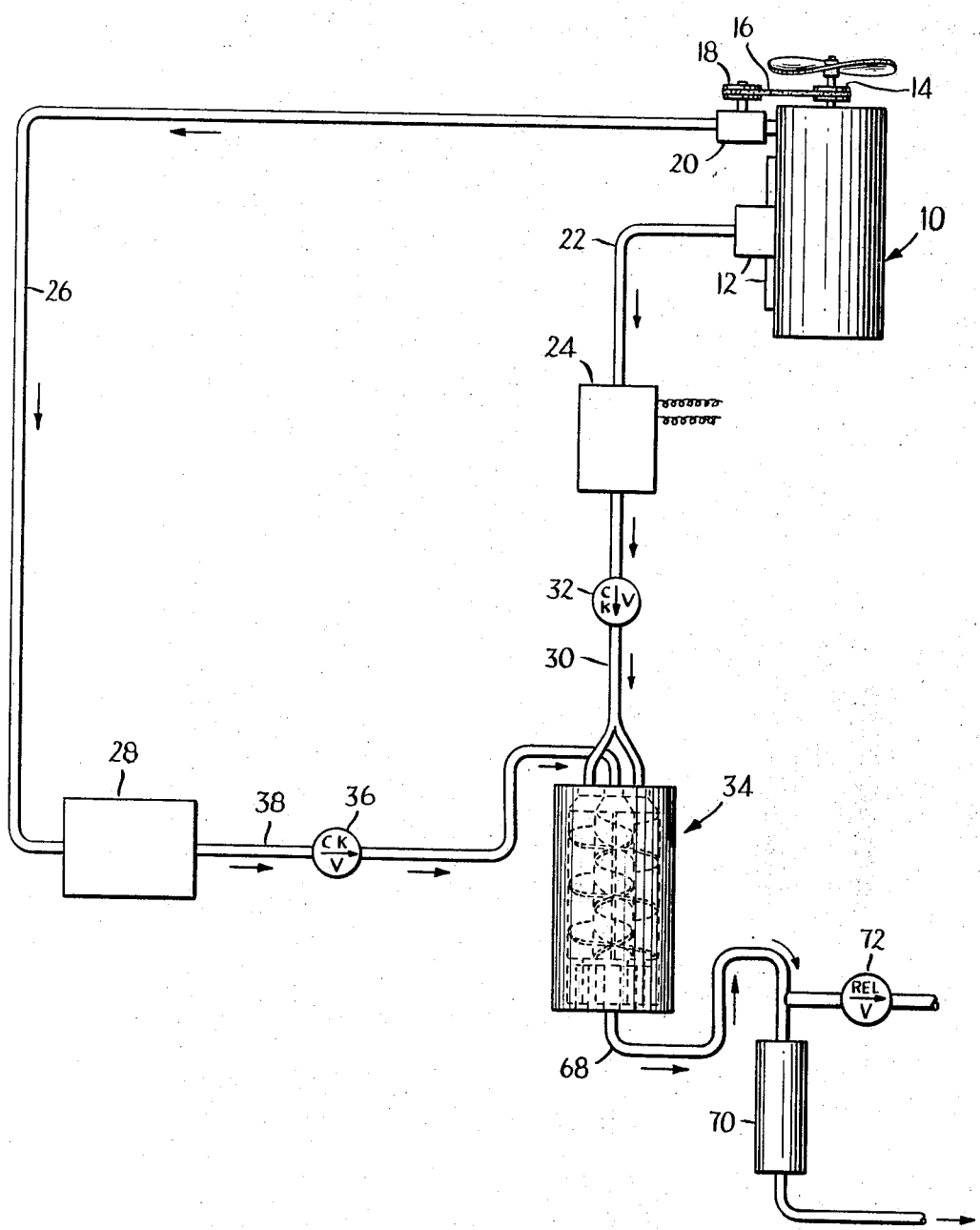
FIG. 1 is a diagramatic depiction of the system provided by the present invention as installed in a vehicle having an internal combustion engine.

Referring now to FIG. 1, there is shown an internal combustion engine 10 which is provided with the customary exhaust manifold 12, a drive pulley 14 to which in conventional manner a belt drive 16 is connected for the purpose of operating a further drive pulley 18 which is used for operating an air pump 20 in the manner to be described in greater detail later. In accordance with the present invention, the engine 10 is set at its maximum rated horsepower to operate with an air/fuel ratio delivering insufficient oxygen to the combustion chambers to allow for nitrogen oxide to form in the engine. Since the hydrocarbons in the fuel have a greater affinity for the oxygen present in the air delivered to the engine and since there is a limit on the oxygen therein, the only pollutants created during the operation of the engine will be enriched levels of hydrocarbons and carbon monoxide. While operating the engine in this fashion with an air/fuel ratio set to deliver insufficient oxygen for there to be creation of any nitrogen oxide, there will result in an increase in fuel consumption by about 7 per cent. However, the latter loss will be recovered in the manner as will appear from the description to be later given in the form of energy useful for the purpose of operating other devices in the vehicle, for example, an air-conditioning system. The enriched hydrocarbons and carbon monoxide exhaust from the engine is delivered therefrom through a pipe 22 to a heat exchange device 24 to cool the products of combustion down to a suitable temperature, e.g., about 750° F. Such heat exchange device desirably is in the form of a Seebeck generator, that is, it is a thermoelectric device which converts the thermal energy of the exhaust to electrical energy, which electrical energy may then be employed for the purpose of operating an air-conditioning system in the vehicle in the manner described in pending application Ser. No. 312,895 filed Dec. 12, 1972 and entitled "Automobile Air-Conditioning System Employing Thermoelectric Devices." During the passage of the exhaust through the Seebeck generator 24, the gases are cooled by the thermoelectric effect attending the functioning of a Seebeck generator device and are brought to temperature levels below that at which any free nitrogen present both in the exhaust products and after mixed secondary air could combine with ozone to form nitrogen oxide. Such ozone is that made available from a flow of high pressure secondary atmospheric air which is used in conjunction with the removal of carbon monoxide and hydrocarbon pollutants in the manner to be described shortly. Concurrent with the operation of the engine in the manner aforesaid, there is delivered from pump 20 a high pressure flow of secondary or atmospheric air which is passed through the hose line 26 to an ozone generator 28. The latter is a device of known construction and is employed to convert the oxygen in the atmospheric air to ozone. The ozone generator 28 as indicated is a device of known construction and functions to convert the oxygen by means of exposure of the air to radiant field energy (from an ozone producing lamp operating on a wavelength of 1,848 angstroms for example) or by spark discharge of an electrical potential. Desirably, the secondary air pump should provide enough air to supply at least a 10 percent excess of ozone when the oxygen is converted thereto above that of the stoichiometric requirement for complete oxidation reaction of hydrocarbons and carbon monoxide with ozone in the soon to be described reaction for converting the hydrocarbons and carbon monoxide to water and carbon dioxide. Further, the ozone generator desirably should for the secondary air flow involved have capacity to convert all the oxygen in the air flow to ozone. The exhaust passing from the Seebeck generator 28 through line 30 passes through a check valve 32 and is delivered to reactor unit 34. Also the secondary air now containing ozone passes through check valve 36 and is delivered through hose line 38 to the reactor unit 34.

Figure 2:
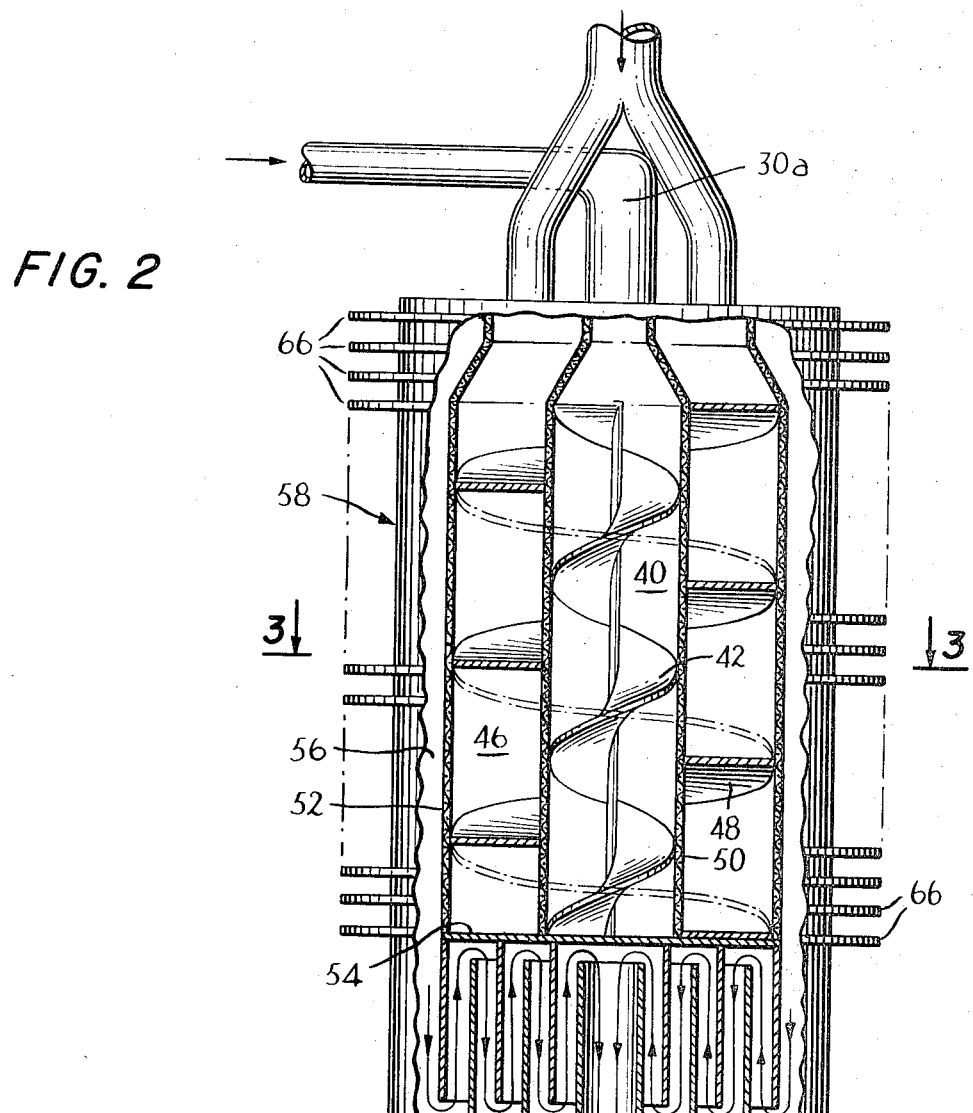
FIG. 2 is a top plan view of the reactor in which the hydrocarbons and carbon monoxide in the exhaust are reacted with the ozone containing secondary air flow, certain portions thereof being broken away for purposes of clarity.
Figure 3:
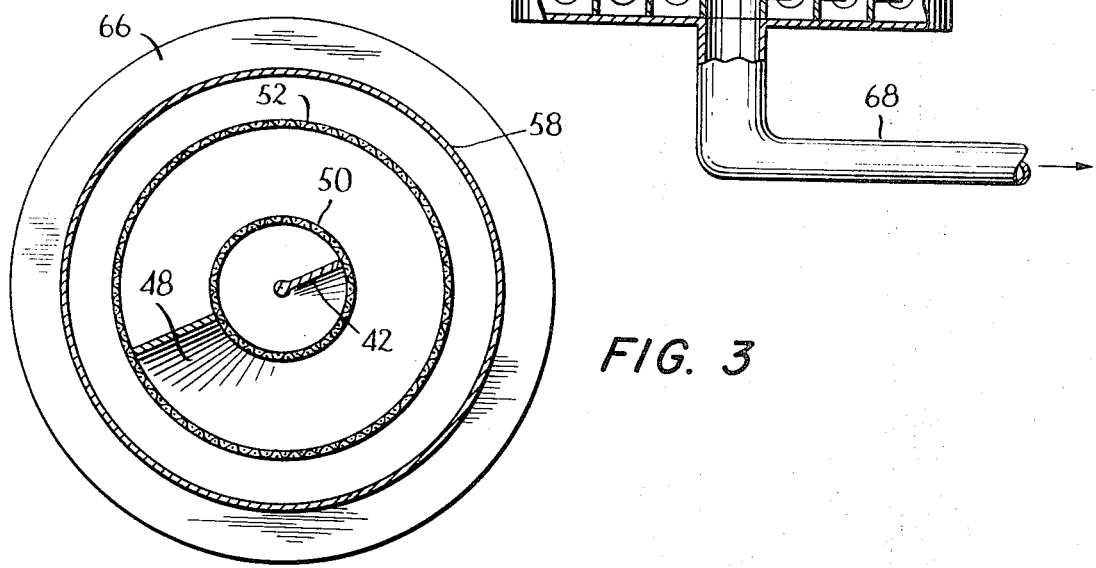
FIG. 3 is a sectional view as taken along the line III—III in FIG. 2.

The reactor unit 34 shown more fully in FIG. 2, is a device which functions under the principles of the law of mass action and is provided for the purpose of increasing the reaction velocity of the pollutants containing exhaust and the ozone containing secondary air. In the reaction chamber 34 the ozone reacts with the hydrocarbons and carbon monoxide pollutants to combine with them and form water and carbon dioxide respectively, the latter two products not being considered pollutants. Further, and since the reaction is carried out in the absence of any catalytic agent and at temperature below those at which nitrogen can combine with oxygen, no nitrogen oxide can be formed. The reactor unit 34 as shown in FIGS. 2 and 3 includes an inner vortexing chamber 40 wherein is located a helical wound member 42 wound in one direction, and which is used to give a swirling motion to the high pressure secondary air containing ozone entering through pipe 30a. Similarly, the outer vortexing component 46 through which passes the pollutants laden exhaust includes a vortexing chamber 48 in the shape of an oppositely wound helix which is in the same fashion employed to give swirling action to the exhaust. The housing 50 in which the inner vortexing component 42 is located is a foraminous member, preferably a screen. Similarly, the outer encircling component 52 enclosing the outer vortexing component 48 is a screen device. In this fashion the two streams of exhaust and atmospheric air containing ozone entering the respective vortexing chambers are caused to swirl in counterwinding directions with the secondary air from the inner member passing radially through the screen 50 to commingle with and react with the carbon monoxide and hydrocarbons in the exhaust. Both streams also pass radially outwardly through screen 52. Both gas flows also impinge on baffle 54 and are directed radially through screen 52 to annular space 56 in housing 58. By confining the two streams in a small space, the reaction velocity following the law of mass action is enhanced by the concentration of the gas molecules, as well as the increasing of the length of time that they are in contact with each other. Following the passage of the exhaust and the ozone containing atmospheric air radially outwardly of the outer vortexing component 46, the gas flow as shown by arrows is directed through a tortuous course as defined by the baffling 60 shown in FIG. 2 to enhance the length of time (residence time) that the reacting gases are in contact with each other to facilitate the completion of reaction of and conversion of pollutants to water and carbon dioxide. During the course of the reaction of the exhaust pollutants with the atmospheric air containing ozone there is generated a considerable quantity of heat in the reaction chamber, which heat is liberated from the chamber outer housing 58 by means of cooling vanes 66.

The reacted gas flow now containing water and carbon dioxide passes along with the remaining exhaust and secondary air flow outwardly from reactor 34 through pipe 68 for discharge through muffler 70 to the atmosphere. To compensate for any excess of pressure built up in the system, a relief valve 72 can be provided in the manner depicted.

Of primary importance in connection with the reaction of the secondary air and exhaust is that the same occurs at relatively low temperature so that any nitrogen present in the secondary air and/or exhaust cannot combine with the ozone to produce nitrogen oxide.

From the foregoing it will be seen then that the present invention offers a method and system which eliminates undesirable pollutants emission to the atmosphere as a consequence of the operation of an internal combustion engine. Further, it operates under low temperature conditions and thereby electively prevents creation of nitrogen oxide as a pollutant. It will be apparent to those skilled in the art that various system parameters as, for example, reaction time of the reactants in reactor 34, temperature to which the exhaust is cooled preliminary to entry to the reactor, quantity of secondary air flow and amount of oxygen in the latter which is converted to ozone, are all dependent upon the size of the engine and with that in mind are readily determinable by those skilled in the art.

What is claimed is:

1. A method for eliminating hydrocarbon, carbon monoxide and nitrogen oxide as pollutants emission resulting from combusting a hydrocarbon fuel in an internal combustion engine which comprises combusting the fuel in said engine at a fuel/air mixture ratio at which enriched levels of hydrocarbon and carbon monoxide pollutants are produced as exhaust from said engine during combustion, cooling said enriched pollutants exhaust to reduce its temperature to a level at which nitrogen cannot combine with oxygen to form nitrogen oxide, establishing a secondary flow of atmospheric air and converting at least some of the oxygen in said atmospheric air to ozone, and then commingling said secondary air flow with said exhaust in a reaction zone to react said ozone with said hydrocarbon and carbon monoxide pollutants and oxidize same converting them to water and carbon dioxide while concurrently increasing the reaction velocity of the reactants while said reactants are in said zone, and removing heat from said reaction zone to maintain the temperature of said zone below that at which any nitrogen in said secondary air and exhaust can combine with ozone to form nitrogen oxide, the exhaust and the ozone containing secondary air flow being introduced into said reaction zone in coaxially oppositely directed helical flow streams with one inside the other, the inner flow stream being at a higher pressure than the second flow stream and being diverted radially of said axis to mix the same with the second flow stream.

2. The method of claim 1 wherein the secondary air flow is directed in a flow course inside the exhaust flow course.

3. The method of claim 1 wherein following the mixing together of said streams, the same are conveyed through a tortuous flow course to increase the time said reactants are in contact with each other.

4. A system for eliminating hydrocarbon, carbon monoxide and nitrogen oxide as pollutants emission resulting from combusting a hydrocarbon fuel at a fuel/air mixture ratio at which enriched levels of hydrocarbon and carbon monoxide pollutants are produced as exhaust comprising in combination with an internal combustion engine in which the fuel is combusted and having an exhaust manifold for receiving the exhaust products from the engine, means connected with said exhaust manifold for receiving said enriched pollutants exhaust and cooling the same to reduce the temperature thereof to a level at which nitrogen cannot combine with oxygen to form nitrogen oxide, means providing a secondary flow of atmospheric air, means for converting at least some of the oxygen in said atmospheric air to ozone, a reactor member connected with said oxygen converting means and said exhaust cooling means for receiving said exhaust and said ozone containing secondary air flow and reacting the ozone with the hydrocarbons and carbon monoxide pollutants for oxidizing same and converting them to water and carbon dioxide, said reactor including means for increasing the reaction velocity of the reactants while they are in said reactor, and means for removing heat from said reactor to maintain the temperature therein below that at which any nitrogen in the secondary air and exhaust can combine with ozone to form nitrogen oxide, said reactor comprising an elongated casing, a helical wound element disposed centrally in said casing and having a foraminous member encircling the same and defining an inner chamber, means for communicating secondary air from said oxygen converting means to said inner chamber, said reactor having a second helical wound element encircling said foraminous member, and a second foraminous member encircling said second helical member and defining a second chamber, said first and second helical members being wound in opposite directions, and means for communicating exhaust from said cooling means to said chamber, there being provided further means for directing flow from said inner to outer chamber radially within said casing.

5. The system of claim 4, in which the second foraminous member and said casing define an annular space within said reactor, said annular space being in communication with a tortuous flow course within said casing downstream of said two chambers, said flow course outletting from said reactor.

* * * * *